United States Patent [19]

Eyles

[11] 3,717,992
[45] Feb. 27, 1973

[54] CONTROL ARRANGEMENT FOR HYDRAULIC TRANSMISSION SYSTEM
[75] Inventor: Leonard William Eyles, Ormskirk, England
[73] Assignee: Joseph Lucas (Industries) Limited, Birmingham, England
[22] Filed: Dec. 1, 1970
[21] Appl. No.: 93,957

[52] U.S. Cl. ................................. 60/19, 60/53 R
[51] Int. Cl. ............................................. F02b 41/00
[58] Field of Search ............... 60/19, 53 A; 68/53

[56] References Cited

UNITED STATES PATENTS

| | | | |
|---|---|---|---|
| 3,508,401 | 4/1970 | Aplin | 60/53 A |
| 3,543,508 | 12/1970 | Schwab | 60/19 |
| 2,941,365 | 6/1960 | Carlson et al. | 60/19 |
| 3,135,087 | 6/1964 | Ebert | 60/19 |
| 3,383,857 | 5/1968 | Rajchel | 60/53 |
| 3,398,530 | 8/1968 | Prevallet et al. | 60/19 X |
| 3,399,531 | 9/1968 | Wright | 60/19 X |
| 3,402,549 | 9/1968 | Connett et al. | 60/19 |
| 3,561,212 | 2/1971 | Pinkerton et al. | 60/53 A |

Primary Examiner—Edgar W. Geoghegan
Attorney—Holman & Stern

[57] ABSTRACT

A hydraulic transmission system is provided with a by-pass relief valve between the pressure and return lines, with such relief valve being operable by a servo pressure. The servo pressure is controlled by a valve responsive to the fluid flow through a fixed displacement pump driven by an engine providing the input to the transmission system. Increase in engine speed above a predetermined level, due to an external torque applied to the output shaft of the transmission, operates the relief valve to by-pass the system.

6 Claims, 2 Drawing Figures

CONTROL ARRANGEMENT FOR HYDRAULIC TRANSMISSION SYSTEM

BACKGROUND OF THE INVENTION

This invention relates to a control arrangement for a hydraulic transmission system of the kind which includes a pump driven by a prime mover, a motor driven by the pump, a pair of passages connecting the motor to the pump, a boost pump for supplying fluid to the passage acting as a return line, with the boost pump being driven at a speed proportional to the speed of the prime mover, an output shaft driven by the motor, and a relief valve between the two passages arranged to interconnect the passages when the pressure in either passage exceeds a predetermined value.

In hydraulic transmissions of the foregoing kind, an external torque applied to the output shaft in its driven direction of rotation will cause the motor to act as a pump and consequent damage to the transmission and prime mover may result.

SUMMARY OF THE INVENTION

According to the invention, a control arrangement for a hydraulic transmission system of the kind specified comprises a means for producing a signal dependent on the rate of fluid flow from the boost pump, a means for sensing the magnitude of the signal and a means responsive to the sensing means for reducing the power conveyed by the transmission system to the prime mover from an external torque applied to the output shaft in its driven direction of rotation.

BRIEF DESCRIPTION OF THE DRAWINGS

Examples of the invention are shown in the accompanying drawings, in which.

DETAILED DESCRIPTION OF THE DRAWING

Figure 1:
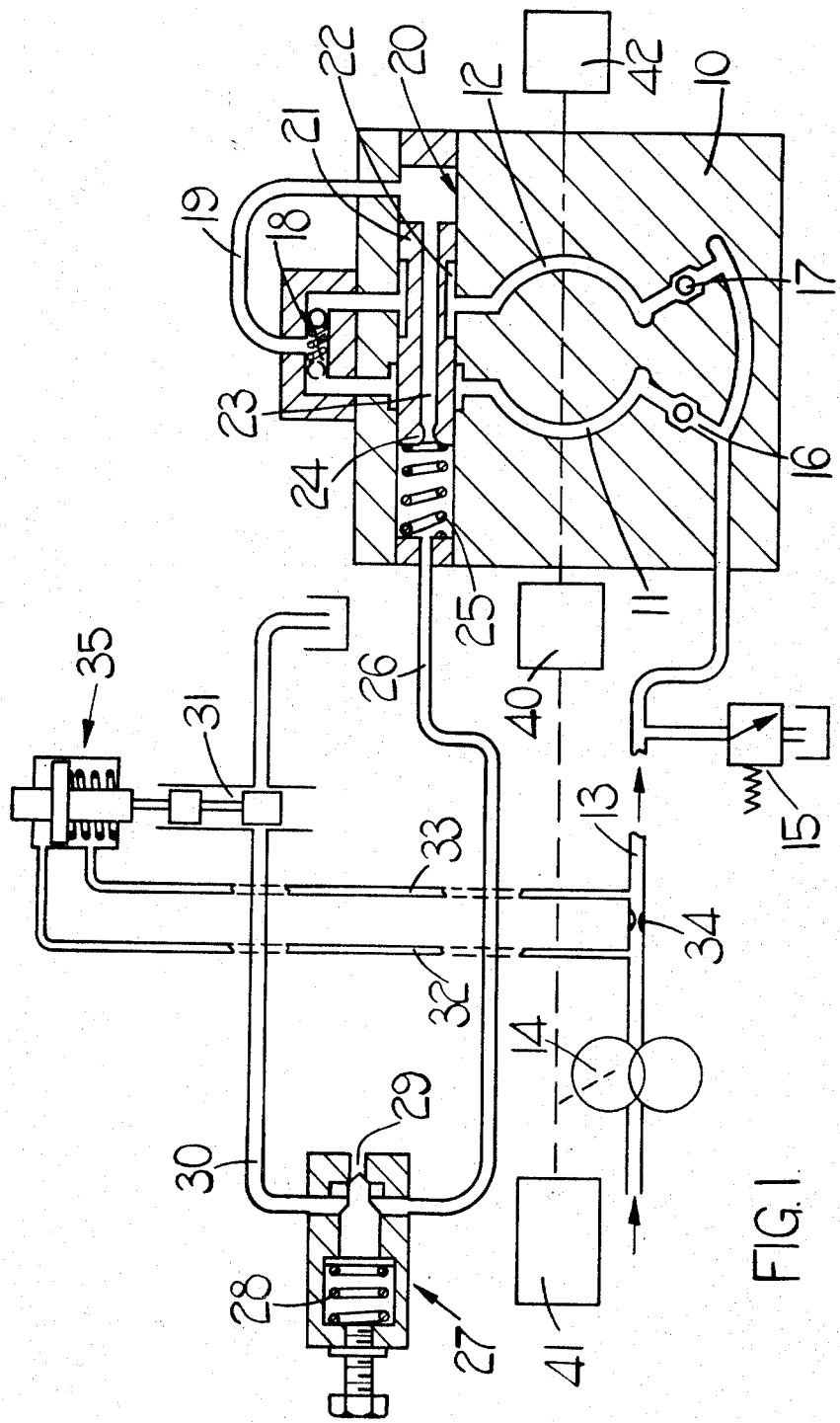
FIG. 1 shows diagrammatically part of a hydraulic transmission system and an associated control arrangement and FIG. 2 shows diagrammatically an alternative form of control arrangement.

As shown in FIG. 1, a hydraulic transmission system has an axial-piston pump 40 driven by a prime mover 41 and an axial piston motor 42 in back-to-back configuration with the pump. Between the pump and the motor is a block 10 having a pair of ports 11, 12 interconnecting the pump and motor, port 12 being at the higher pressure when the motor has a direction of rotation corresponding to forward movement. Ports 11, 12 are connected via a passage or line 13 to a fluid supply from a fixed displacement boost pump 14 driven by the prime mover. A boost relief valve 15 ensures that fluid flow through the pump 14 remains proportional to the speed of the pump 14. A pair of shuttle valves 16, 17 serve to isolate whichever of the ports 11, 12 is at the higher pressure from the other port and from the passage 13. Ports 11, 12 are also connected via a further shuttle valve 18 to a passage 19 which opens into one end of a bore 20 in the block 10. A spool valve 21 is slidable in the bore 20 and includes a recess 22 by means of which ports 11, 12 may be interconnected. The spool valve 21 has an axial bore 23 formed at one end with a flow restrictor 24.

The valve 21 is urged in a direction to isolate the ports 11, 12 from each other by a spring 25. The end of the bore 20 remote from the passage 19 communicates, via a passage 26, with a pilot valve 27 which is loaded by a spring 28 and includes a vent 29. The passage 26 also communicates with a passage 30 which includes a normally closed by-pass valve in the form of a spool valve 31.

A pair of passages 32, 33 are connected on either side of a flow restrictor 34 in the line 13 upstream of the relief valve 15. The passages 32, 33 supply fluid pressure to opposite sides of a spring-loaded cylinder piston unit 35 which engages the spool valve 31.

In use, with the motor rotating in a forward direction and the port 12 at the higher pressure, the shuttle valve 18 operates to allow the higher pressure to pass via the passage 19, bores 20, 23 and passages 26, 30 to the spool valve 31.

If the transmission is operating so as to provide a speed reduction at the motor output and an external torque is applied to drive the motor in a forward direction, the motor will act as a pump and the transmission will tend to drive the prime mover at an increased speed. The resulting increase in speed of the boost pump 14 causes an increased flow through the restrictor 34 and an increase in the difference in the pressures in the lines 32, 33. When the pressure difference reaches a predetermined level, the valve 31 opens. The resultant flow through the restrictor 24 causes a pressure drop urging the valve 21 against the spring 25 to allow ports 11, 12 to intercommunicate. The dimensions of the restrictors 24, 34, spring 25 and piston unit 35 are such that in these conditions, a pressure difference will nevertheless continue to be maintained between ports 11, 12. The prime mover will thus continue to act as a brake on the external torque though the resulting power conveyed by the transmission system will not be sufficiently large as to cause damage to the system itself or to the prime mover. The piston unit 35 is arranged to be manually operated, if required to open the valve 31.

Figure 2:
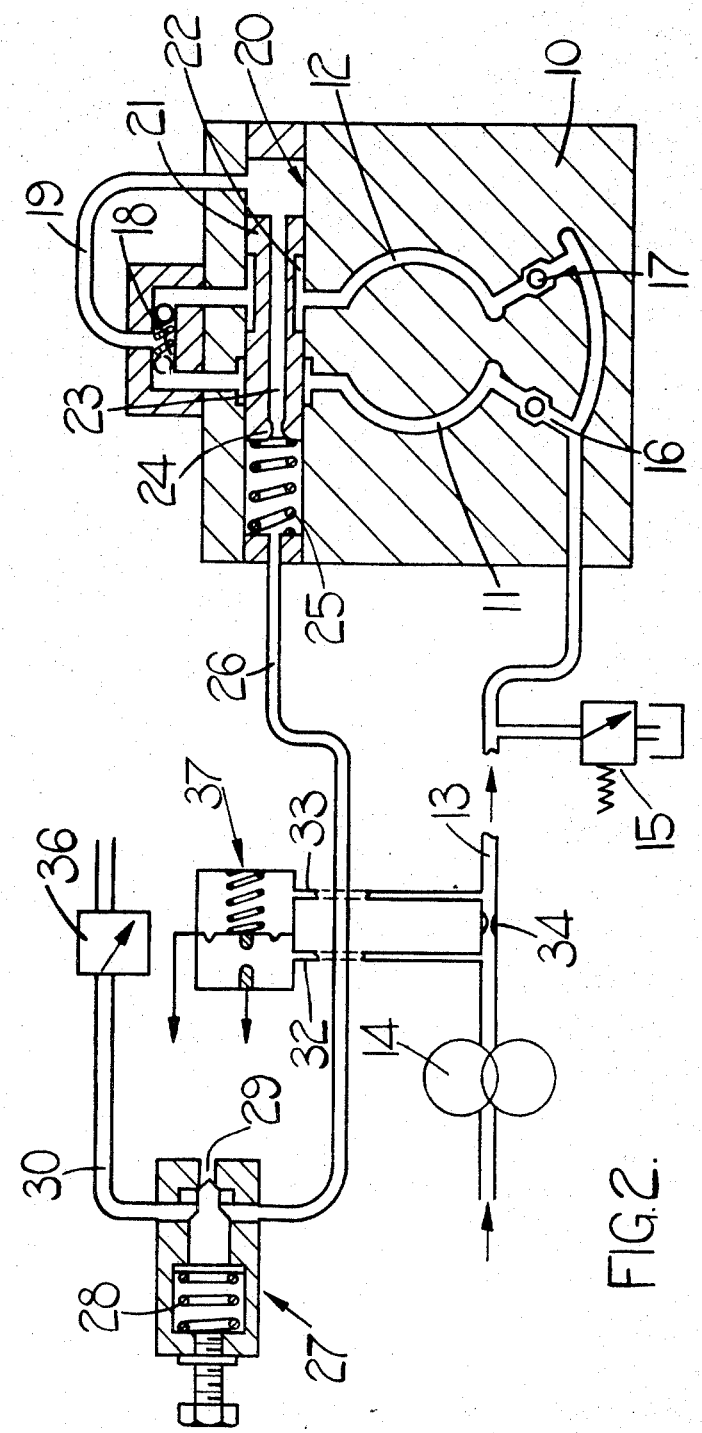

The alternative arrangement shown in FIG. 2 comprises a transmission system substantially as previously described except that the by-pass valve in the line 30 is a manually operated valve 36 and the passages 32, 33 are connected to a pressure-sensitive electric switch 37. If an external torque causes a rise in the pressure difference in the passages 32, 33, in a manner already described, the switch 37 is operated to break the power supply to a solenoid which is holding off a brake associated with an output shaft of the motor. The brake is thereby applied and the torque to the motor reduced.

Having thus described my invention what I claim as new and desire to secure by Letter Patent is:

1. A control arrangement for a hydraulic transmission system which includes a prime mover, a pump driven, in use, by the prime mover, a motor driven by fluid from the pump, a pair of passages providing communication between the motor and the pump, a boost pump, a line between the boost pump and the passages for supplying fluid to the passage acting as a return line, said boost pump being driven at a speed proportional to the speed of the prime mover, an output shaft driven by the motor, a relief valve in the line between the two passages arranged to interconnect the passages when the pressure in either passage exceeds a predetermined value, said control arrangement comprising means producing a signal dependent on the rate of fluid flow from the boost pump, means sensing the magnitude of said signal and means responsive to said sensing means to reduce the power conveyed by the transmission system to the prime mover from an external torque applied to the output shaft in its driven direction of rotation.

2. The control arrangement as claimed in Claim 1 in which the means for producing a signal dependent on the rate of fluid flow comprises a fluid flow restrictor in the lines upstream of the relief valve and a pair of connections respectively upstream and downstream of the flow restrictor.

3. The control arrangement as claimed in Claim 2 in which the means for sensing the magnitude of the signal comprises a cylinder-piston unit, said connections respectively communicating with opposite sides of the piston, and biasing means urging the piston against the upstream pressure.

4. The control arrangement as claimed in claim 2 in which the means for sensing the magnitude of the signal comprises a switch operable to produce an electrical control signal when the pressure difference upstream and downstream of said restrictor exceeds a predetermined value.

5. The control arrangement as claimed in Claim 1 in which the relief valve in-cludes a restricted orifice and a selector valve by means of which said orifice communicates with whichever of the pair of passages is at the higher pressure, and said means responsive to said sensing means comprises a control valve operable to regulate flow through said orifice to provide a servo pressure to operate the relief valve.

6. The control arrangement as claimed in claim 5 which includes a pilot valve operable when the pressure downstream of said orifice exceeds a predetermined value to increase the flow through the orifice.

* * * * *